Oct. 20, 1942.  R. R. BLOSS  2,299,208
WATER COOLED BRAKE
Filed Jan. 30, 1940  4 Sheets-Sheet 3

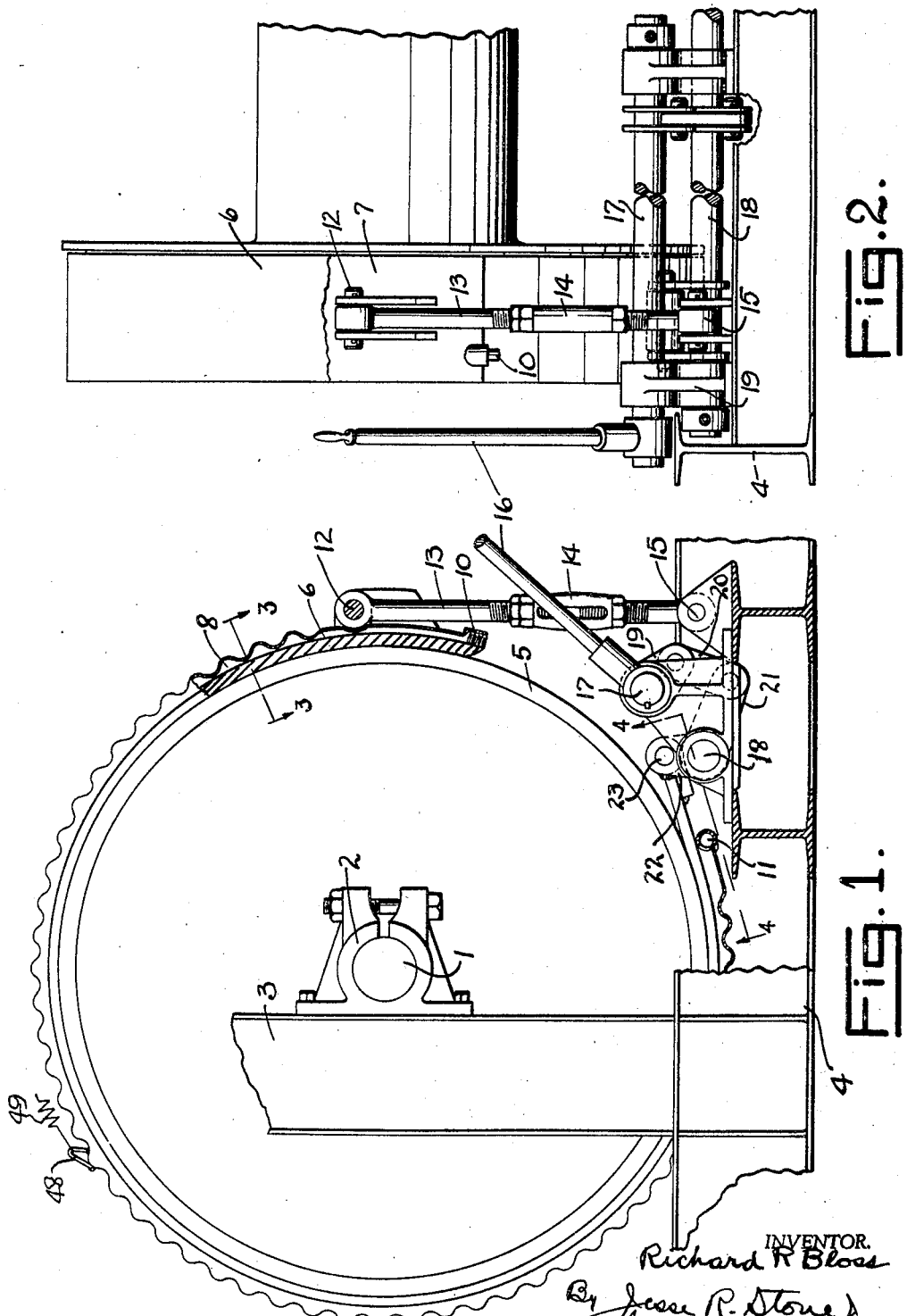

Richard R. Bloss INVENTOR.
BY Jesse R. Stone
Lester D. Clark
ATTORNEYS

Oct. 20, 1942.   R. R. BLOSS   2,299,208
WATER COOLED BRAKE
Filed Jan. 30, 1940   4 Sheets-Sheet 4

Richard R. Bloss INVENTOR.
BY Jesse R. Stone
Lester B. Clark
ATTORNEYS

Patented Oct. 20, 1942

2,299,208

UNITED STATES PATENT OFFICE 2,299,208

WATER COOLED BRAKE

Richard R. Bloss, Beaumont, Tex., assignor to The International Derrick & Equipment Company of Texas, a corporation Application January 30, 1940, Serial No. 316,328

4 Claims. (Cl. 188—264)

The invention relates to brake drums and particularly to brake drums which are employed in raising and lowering heavy loads as are encountered in oil well drilling.

In brakes such as are employed in raising and lowering heavy loads about the drilling rig, and particularly in handling the drill stem and drill bit on going into the hole with heavy pipe, a brake such as is herein contemplated must be used. In such a structure the brake, in the performance of its intended function, must necessarily convert mechanical energy into heat. In stopping the descent of a heavy string of tools attached to a cable wound on the drum, the total mechanical energy of the moving bodies—weight, cable, drum, etc., is converted into heat, the sum total of which is exactly equivalent to the mechanical energy of the moving parts. The heat thus generated is the greatest destructive force to the friction material of the brakes and the brake bands. In the case of the friction material, its wear or destruction is accelerated greatly as the temperature rises. This sort of material at low temperature might give many months of service, whereas if the operating temperature is allowed to rise only a few degrees, the rate of wear may be multiplied many times, and when this temperature reaches a critical point, immediate charring and destruction of the friction material takes place. In the case of the brake bands, excessive heat on these will cause the steel surface to "score" and "check."

We must not lose sight of the fact that the generation of the heat is simultaneous with the stopping of the moving bodies. If a brake is powerful and capable of stopping a fast moving heavy body very quickly, then the energy of this body is just as quickly converted into heat. If this operation takes place in the fraction of a second, the total heat generated is accomplished in this same minimum time, and this total heat may be sufficient and take place in such a short period of time that the metal of the brake band is heated to a very high temperature, in some instances above its critical, or high enough to melt the band. When this occurs, scoring of the metal takes place. Another objectionable phenomena is the checking, which is due to repeated high temperatures on the surface of the band occurring so fast that the heat cannot flow through the metal sufficiently fast to escape. In this case the hot metal must expand, and in so doing it is subjected to terriffic compression. Later, when it cools, it attempts to pull itself back into its original shape, creating great tension and causing fine cracks to develop. These cracks penetrate deeper and deeper with successive heatings and coolings until finally they extend entirely through the band. Since these tremendous quantities of heat are generated so rapidly, it is essential that there be a relatively large volume of cooling fluid in contact with the brake band to absorb these peak heat loads. Otherwise, the cooling fluid, water in most cases, will flash into steam, and steam is not a good conductor of heat.

It is an object of the invention to provide means for cooling the brake band which will function to maintain the brake band and drum against excessive heat due to the action of the brake on the drum.

I desire to provide a system of circulation of cooling fluid through the drums employed in connection with the draw works of a rig which will maintain the brake bands cool at all times. In carrying out the device it is contemplated that the cooling system may be connected with the cooling system of such internal combustion engine as may be employed in connection with the drilling rig.

It is a further object of the invention to provide a brake band of strong and sturdy construction but which will be sufficiently flexible so that it may be readily applied in the operation of the brake.

It is a further object to so mount the brake band upon the drum that it may be tightened in taking up for wear upon the band or the lining thereof without causing the band to move away from the drum.

It is also an object to provide a water cooled brake band of the type described with an efficient type of equalizing device applied thereto which will enable the brakes to be operated with equal pressure on both drums of the hoisting device.

The invention further includes the various points of construction of the device an understanding of which may be obtained with reference to the drawings herewith. It is desired to provide a water circulating system for cooling the brakes which is independent of an outside reservoir in which the flow may be clogged during freezing temperature due to freezing of the circulating fluid. In this invention the fluid from the engine is sufficiently heated to keep it from freezing on its route to the brakes.

In the drawings,

Fig. 1 is an end elevation of a hoisting drum with my improved type of brake band employed thereon, certain parts being broken away for greater clearness.

Fig. 2 is a broken front elevation of the brake band shown in Fig. 1.

In the improved form of my brake band construction I contemplate the mounting of the brake drum in any preferred manner, the end trunnions 1 being supported in bearing members 2 secured upon an upright support 3. Said support is in turn mounted upon a base structure 4.

Figure 3:
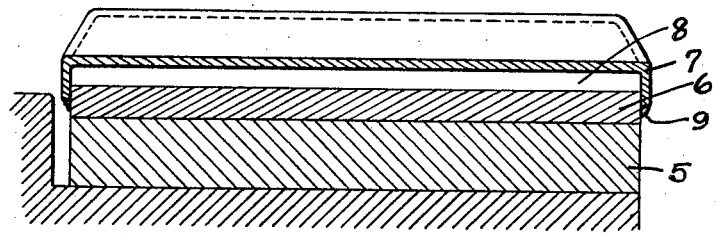
Fig. 3 is an enlarged sectional detail taken on the plane 3—3 of Fig. 1.
Figure 4:
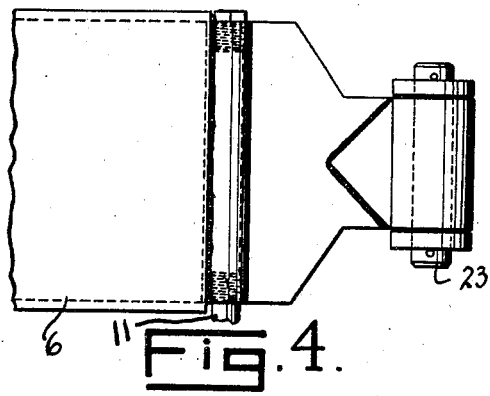
Fig. 4 is an enlarged detail showing the end of the brake band with the attachment for fluid circulation shown thereon.

The brake drum has around its outer periphery a brake lining 5, which is secured rigidly upon the periphery of the brake drum by any preferred means, such as rivets, bolts and the like. This brake lining is shown in section in Fig. 3 and it will be understood that it entirely surrounds the drum and is securely fastened thereto.

The brake band comprises a band 6 of steel or other similar material on the outer face of which is secured a corrugated outer wall 7 enclosing a chamber 8 for cooling fluid. The outer enclosing wall 6 is secured to the outer edges of the brake band by welding 9 or any other preferred means whereby the chamber 8 within the outer wall is tightly sealed. At the ends of the brake band I provide threaded openings 10 which furnish attachment for a fluid conducting line for the circulation of liquid into and through the chamber 8. At the free end of the brake band a similar connection 11 is provided it being understood that the fluid may be circulated in at one end of the chamber and out the other, as will be later noted.

The dead end of the brake band is normally stationary and is connected at 12 to an anchor rod 13 having therein a turnbuckle 14. The lower end of this anchor rod is pivotally secured at 15 to a bracket upon the base 4. The attachment of the brake band to the anchor rod may be noted. It is placed at a point spaced from the end of the brake band at a point slightly above the horizontal radius of the drum and when the turnbuckle is employed to shorten the length of the rod and move the deadend of the brake band downwardly to take up for wear upon the band or the drum there is no moving of the brake band away from the drum and hence it is possible at all times to maintain the full length of the brake band in contact with the drum.

The free end of the brake band is arranged for attachment to a system of levers whereby a pull may be exerted upon the band in tightening the same upon the drum. In this arrangement I have shown a hand lever 16 secured upon the end of a shaft 17 mounted for rocking in the frame. This shaft is arranged to rotate an adjacent shaft 18 through means of a lever arm 19 on the shaft 17 connected by means of a link 20 with a lever arm 21 upon the shaft 18. Upon the shaft 18 is a short arm 22 which is pivotally connected at 23 to the free end of the brake band. It will be noted that in the position shown in Fig. 1 the brake lever has been depressed to a point where the brake band is fitting closely against the drum. Any further depression of the lever arm 16 will exert pressure upon the band so as to stop the rotation of the drum.

Figure 6:
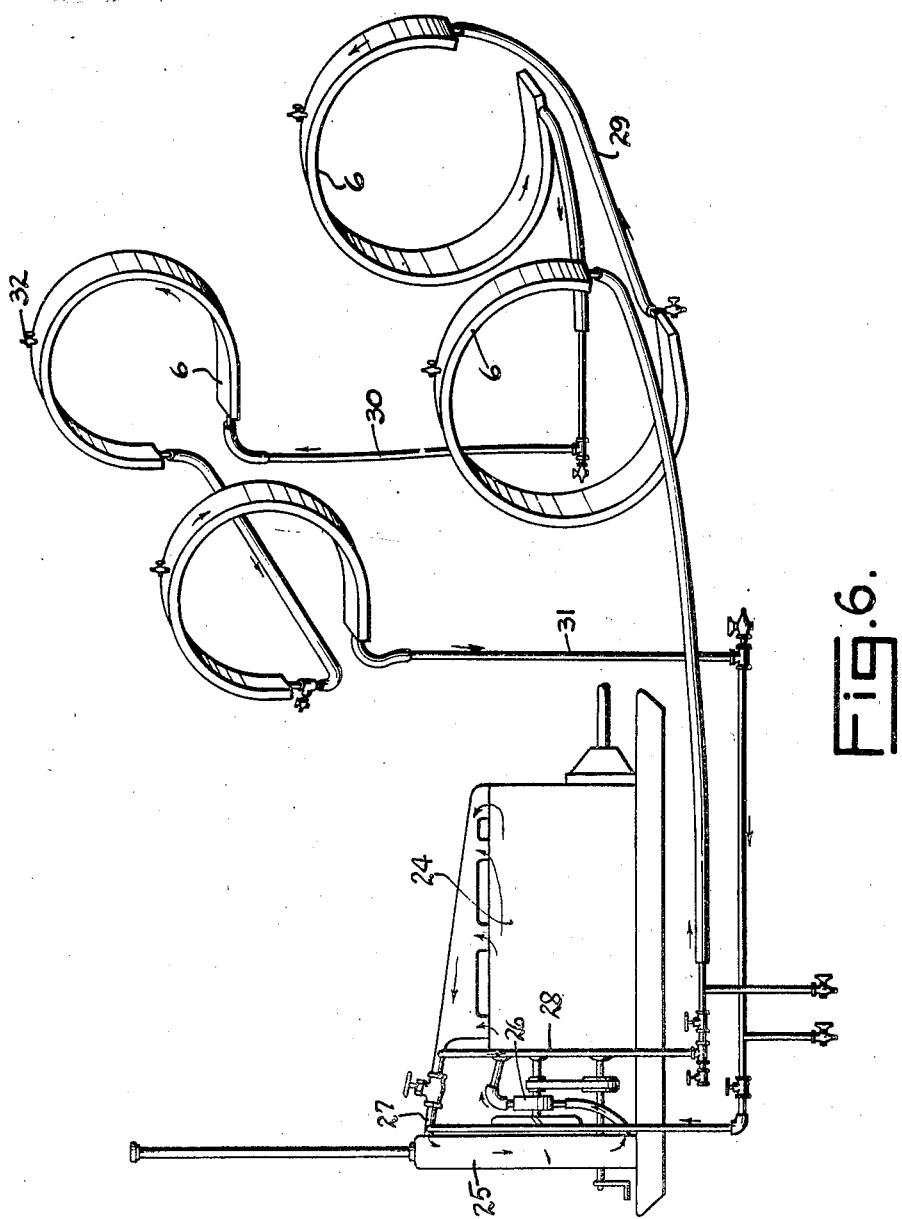
Fig. 6 is a diagrammatic showing of the fluid circulation which may be employed in cooling the brake bands of my hoisting device.
Figure 7:
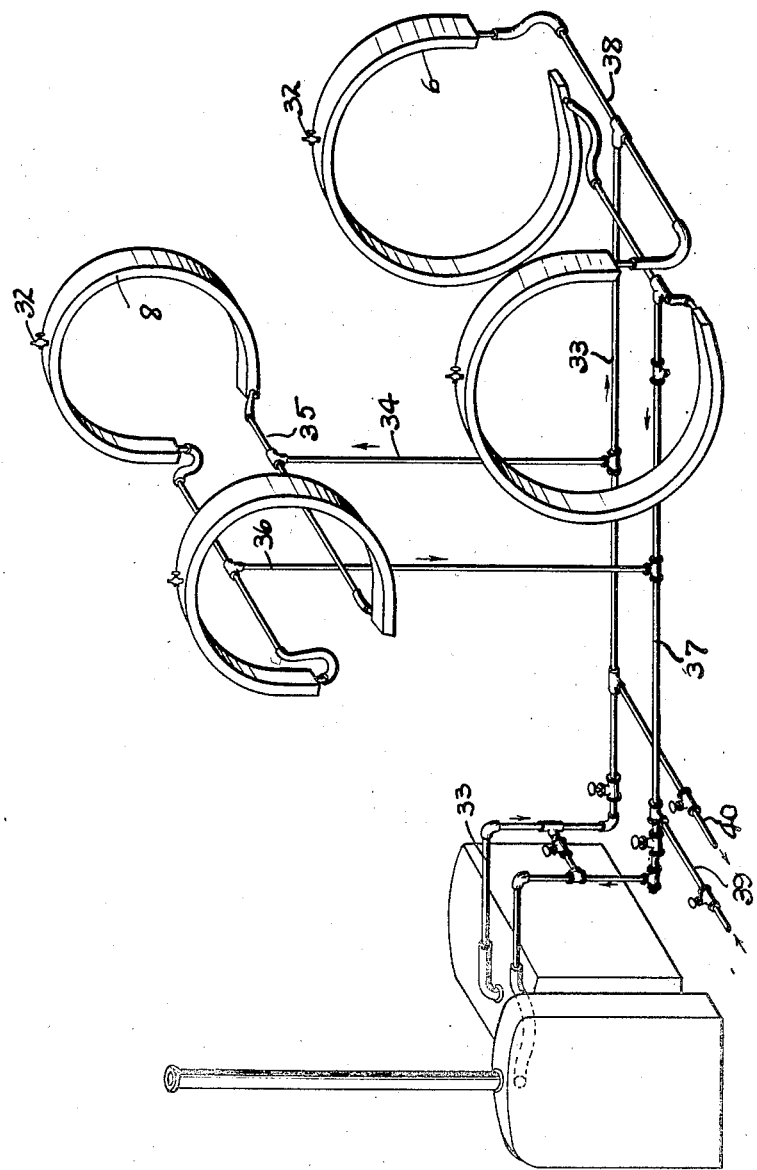
Fig. 7 is a diagrammatic view similar to that shown in Fig. 6 with a slightly different arrangement for fluid circulation.

In Figs. 6 and 7 I have shown the manner in which the cooling fluid may be circulated through the bands upon two different drums employed in the draw works of a rotary. The circulation in the particular installation shown in Fig. 6 is from the cooling liquid from the internal combustion engine 24 which may be employed in connection with the rig. In this particular arrangement the cooling fluid is circulated by means of a pump arranged in connection with the radiator 25 of the engine. Fluid is circulated from the pump 26 through and about the engine cylinder and back through pipe 27 to the radiator. This is an ordinary system of cooling fluid circulation and I have arranged to connect up the cooling circulation to the brake bands from the engine cooling system. Fluid will be pumped from the engine through pipe 28 to the brake band 6 upon one of the drums. It will circulate through this band and through pipe 29 to the band at the opposite end of the reel. From this band it will circulate through pipe 30 to other brake bands connected with an upper hoisting drum, and from thence through pipe 31 back to the pipe 27. It will be seen that there will be a continuous circulation of cooling fluid from the engine through the different brake bands and back again to the engine. I provide various valves in the line whereby the control of the circulation may be obtained or the fluid from the lines drained out of the system. It will now be noted that at the upper end of each of the brake bands I provide a small tap 32 which may be opened occasionally to allow the escape of any air which may be trapped in the system during the circulation of the liquid.

In Fig. 7 the circulation to the brake bands is very similar to that in the installation shown in Fig. 6. The fluid may be circulated from the engine through the pipe 33 to a branch pipe 34, which is connected between the ends of a pipe 35 which connects the free ends of the brake bands 6. From the stationary ends of the brake bands branch pipes are connected to the line 36, which is in turn connected to the return line 37. The circulating line 33 is also connected to the branch line 38 which circulates the fluid through the two forward brake bands 6 and from there back through the return line 37 to the circulating system of the motor. In this arrangement it will be seen that fluid may be circulated through one end of each of the pair of brake bands and out the other ends back to the return system. This is a superior form of circulation when used in connection with some types of draw works. It will also be noted that the lines leading from the circulating system of the engine to the brake bands may also be connected through inlet line 39 and outlet line 40 to a storage line through which a large amount of circulating liquid may be employed, particularly where the heat generated in the brake bands is not sufficiently carried away by the circulating system of the engine. It will thus be assured that a sufficient volume of circulating fluid may be obtained to properly cool the brake bands under all circumstances.

Figure 5:
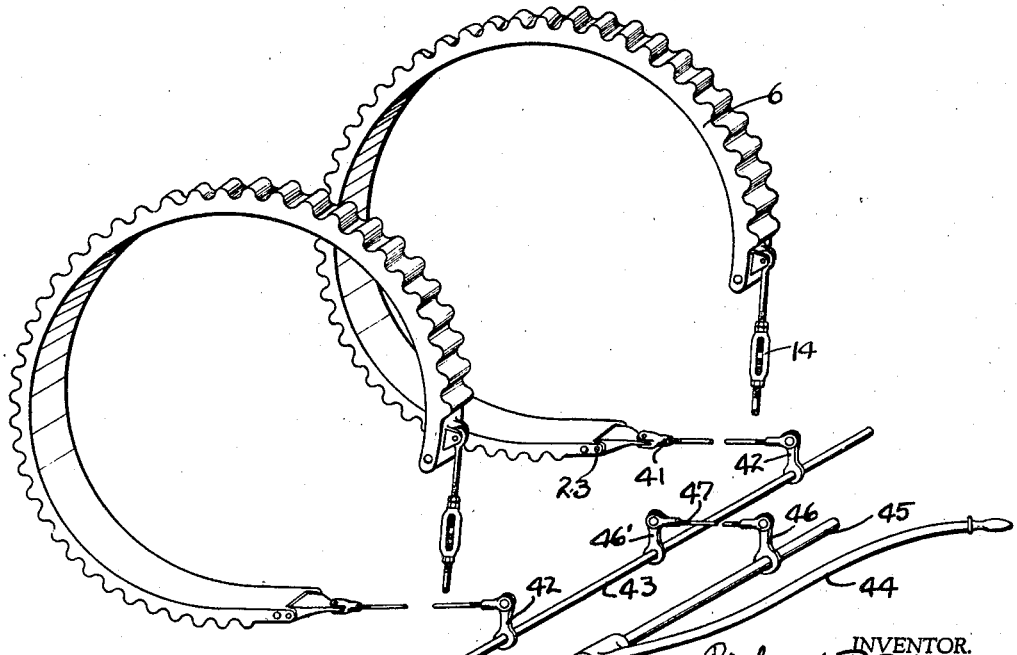
Fig. 5 is a diagrammatic showing of a pair of brake bands adapted to be applied to a hoisting drum with a novel equalizing means connected therewith.

In Fig. 5 the brake band 6 at each end of the drum is adapted to be tightened through a novel form of equalizer. The free ends 23 of each band is connected to a pull rod 41, which is connected at its opposite end to a crank arm 42 upon a rod 43. Said rod 43 is connected with each of the brake bands at the ends of the hoisting drum and is adapted to exert a pull thereon simultaneously through the operation of the hand lever 44. This is accomplished through the partial rotation by said lever of a shaft 45 having thereon a crank arm 46, which is connected by the rod 47 to a similar crank arm 46' upon the rod 43. The crank arm 46' is mounted midway between the two arms 42 and normally will exert an equal pull upon both of the brake bands. The shaft or rod 43 is however, small enough in diameter so that it is flexible and under the torque exerted thereon by the operation of the lever 44 will give somewhat so that if one of the brake bands is slightly tighter than the other, due to wear or otherwise, the arm 42 which is connected to the tighter of the two bands will give somewhat due to the torque upon the rod 43 and allow a pull to be exerted by the opposite arm 42 upon the other brake band, thus assuring to the operator that both brake bands will be tightened sufficiently to properly stop the rotation of the drum. If the difference in adjustment of the two bands is large enough to be observed by the operator the looseness in one or the other of the bands may be taken up by the operation of its turnbuckle 14.

It will be obvious that a brake band constructed in accordance with my invention will tend to maintain its approximately circular shape due to the heavy construction of the band. However, due to the corrugated outer wall of the cooling chamber a greater amount of flexibility in the band is obtained and under normal circumstances when the brake band is loosened it will tend to spring away from the brake drum but will maintain a generally circular shape. In order that the brake will be held away from the drum after it has been loosened I provide at the upper side of the brake band a resilient support shown in Fig. 1 as including an eyelet 48 secured to the outer surface of the band and attached by means of a spring 49 to a stationary support, not shown.

The arrangement of the spring member 49 relative to the band is such as to exert a pull upon the band raising it upwardly and toward the drum in such manner as to prevent its movement to one side thereof and holding it in uniformly spaced relation relative to the drum when the brake is not applied.

It will be obvious that the corrugated outer wall of the fluid circulating chamber leads to greater flexibility in the band and also provides a larger cooling surface presented to the atmosphere which will assist in maintaining the band from overheating. The brake is therefore more flexible than would otherwise be the case where the outer wall is not corrugated in the manner described.

It will be noted that the cooling fluid is applied to the brake band rather than to the lining or the drum. By so doing the overheating of the surface to which the brake band is applied is more accurately obtained. All surface to which the band is applied is adapted to be cooled through the circulation of the cooling liquid, and as has been previously noted the circulation of the cooling fluid through the system of brake bands may be accomplished at a minimum of expense.

I have thus provided a brake band which is simple in construction and in which provision is made for a more efficient cooling of the friction surfaces so that excessive heat and wear upon the contracting surfaces will be avoided even in the handling of heavy loads such as are encountered in the operation of well drilling. It is further to be noted that the application of brakes by my improved form of equalizer will be effectively maintained even where the brakes are not exactly adjusted.

What is claimed is:

1. A brake drum, a surfacing of friction material entirely around the periphery thereof, a brake band on said drum, an outer transversely corrugated wall secured to said band forming a chamber about said band, means to circulate a cooling fluid through said chamber and means to tighten said band upon said friction material and against said drum.

2. A brake drum, a surfacing of friction material entirely around the periphery thereof, a brake band on said drum, an outer transversely corrugated wall secured to said band forming a chamber about said band, means to circulate a cooling fluid through said chamber means to normally support said band spaced from said drum, and means to tighten said band upon said friction material and against said drum.

3. A brake band for hoisting drums having a brake drum at each end thereof, including a steel band, an anchor for one end of said band, means to exert a pull upon the other end thereof, a wall of transversely corrugated sheet metal spaced from said band to enclose a fluid circulating chamber and means to circulate fluid through said chamber from one end thereof to the other.

4. A hollow brake band having a thin transversely corrugated outer wall, means to circulate a cooling fluid through said band from one end to the other, said band describing an approximate circle of slightly larger diameter than that of the drum to which it is applied, means to support said band resiliently in spaced relation from its drum, and means to tighten said band upon its drum.

RICHARD R. BLOSS.